(12) United States Patent
Collet et al.

(10) Patent No.: US 8,849,591 B2
(45) Date of Patent: Sep. 30, 2014

(54) METHOD FOR PROCESSING A SIGNAL FROM A FLOW METER FOR MEASURING A GAS FLOW IN AN INTERNAL COMBUSTION ENGINE

(75) Inventors: Alexandre Collet, Chalo-St-Mars (FR); Kevin Robert, Bretigny sur Orge (FR); Benjamin Gresiak, Milly la Foret (FR)

(73) Assignee: Renault S.A.S., Boulogne Billancourt (FR)

(*) Notice: Subject to any disclaimer, the term of this patent is extended or adjusted under 35 U.S.C. 154(b) by 309 days.

(21) Appl. No.: 13/203,779

(22) PCT Filed: Feb. 26, 2010

(86) PCT No.: PCT/FR2010/050341
§ 371 (c)(1),
(2), (4) Date: Sep. 6, 2011

(87) PCT Pub. No.: WO2010/100372
PCT Pub. Date: Sep. 10, 2010

(65) Prior Publication Data
US 2011/0313687 A1    Dec. 22, 2011

(30) Foreign Application Priority Data
Mar. 3, 2009  (FR) .................................... 09 00948

(51) Int. Cl.
G06F 19/00    (2011.01)
(52) U.S. Cl.
USPC ........... 702/45; 701/104; 73/114.34; 700/282

(58) Field of Classification Search
CPC . G01F 1/8436; F02D 41/2467; F02D 41/187; G05D 7/0635
USPC ........... 702/45; 701/104; 73/114.34; 700/282
See application file for complete search history.

(56) References Cited

U.S. PATENT DOCUMENTS

| | | | |
|---|---|---|---|
| 4,386,520 A | | 6/1983 | Nagaishi |
| 4,424,568 A | * | 1/1984 | Nishimura et al. ........... 701/110 |
| 4,664,090 A | | 5/1987 | Kabasin |
| 4,730,255 A | | 3/1988 | Akiyama et al. |
| 5,537,981 A | | 7/1996 | Suedholt et al. |
| 2009/0107140 A1 | * | 4/2009 | Pursifull .......................... 60/600 |
| 2009/0223221 A1 | * | 9/2009 | Onishi et al. .................... 60/603 |

FOREIGN PATENT DOCUMENTS

| | | |
|---|---|---|
| EP | 0 219 967 | 4/1987 |
| JP | 58 27828 | 2/1983 |

OTHER PUBLICATIONS

International Search Report issued Jun. 9, 2010 in PCT/FR10/50341 filed Feb. 26, 2010.

* cited by examiner

*Primary Examiner* — John Breene
*Assistant Examiner* — Haihui Zhang
(74) *Attorney, Agent, or Firm* — Oblon, Spivak, McClelland, Maier & Neustadt, L.L.P.

(57) ABSTRACT

A method for processing a signal from a flow meter for measuring a gas flow in an internal combustion engine includes processing the signal according to a first logic when the engine operates in a first intake mode and processing the signal according to a second logic when the engine operates in a second intake mode. The first intake mode includes the activation of a high-pressure EGR valve. The second intake mode includes the activation of a low-pressure EGR valve.

20 Claims, 6 Drawing Sheets

*Methodology for linearizing and recalibrating the flow meter*

METHOD FOR PROCESSING A SIGNAL FROM A FLOW METER FOR MEASURING A GAS FLOW IN AN INTERNAL COMBUSTION ENGINE

BACKGROUND

The present invention relates to a method for processing a signal from a flow meter for measuring a gas flow in an internal combustion engine so as to determine the quantity of air taken into the engine. The invention also relates to a method for configuring a system for processing a signal from a flow meter for measuring a gas flow in an internal combustion engine. The invention also relates to a data medium comprising computer programs for governing these methods. The invention further relates to a processing system, a measuring system comprising such a processing system and a motor vehicle comprising such a processing system or such a measuring system.

The future anti-pollution standards will require motor vehicle manufacturers to improve engine monitoring, that is to say, to control the engine more finely so that its impact on the environment is reduced. For this, it is necessary to accurately know the quantities of air supplied to the combustion chambers of the engine. To this end, air flow meters are used to measure the air flow rate feeding the engine. The engine may be any kind of combustion heat engine, in particular internal combustion heat engines with no distinction concerning the numbering of strokes in the operating cycle, the injection mode, etc. The invention thus applies:

- to diesel engines, with or without supercharging, any combustion mode,
- to controlled ignition petrol engines, with or without supercharging, any combustion mode,
- to flex-fuel engines using a variable mixture of petrol and ethanol,
- to gas engines.

On a combustion engine, any flow rate information (by volume or by mass) is likely to be measured by virtue of a flow rate sensor such as a flow meter or a pressure sensor. The raw signals from a flow rate sensor are processed by a computer program contained in a computer or an electronic control unit, the computer program making it possible to condition the signals and correct them, notably to filter them, in order to obtain reliable information that can be used by engine control strategies. Before these processing operations, a mapping is usually used to convert the electrical signals into physical flow rate information.

The principle of flow rate measurement by a flow meter is based on a measurement of local speed in a section of the flow meter, then a multiplication of the measured speed value by the area of the section of the flow meter. However, this flow rate measurement principle is sensitive to 2 factors:

- the speed profile in the section, this speed not being constant because of aerodynamic phenomena,
- the flow rate pulsings that result from the cyclic operation of the engine.

Figure 1:
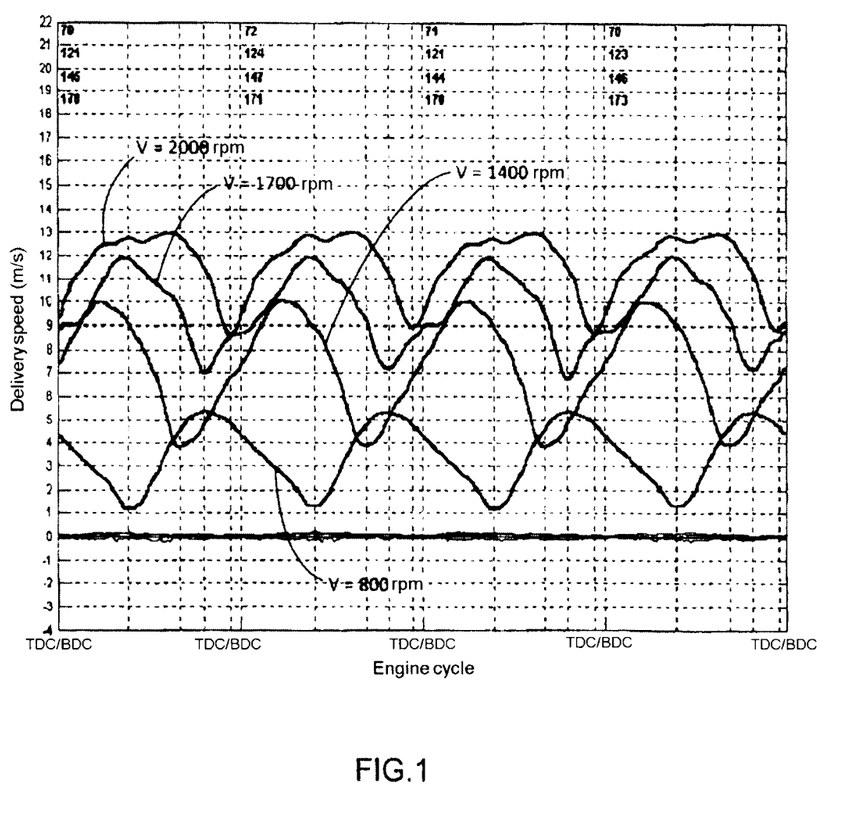
FIG. 1 is a graph illustrating the influence of the engine rotation speed on the air flow rate taken into the engine.

It also appears that the speed of rotation of the engine and the load are two main variables that influence the form of the flow rate pulsing as shown in FIG. 1, in which 4 curves are represented giving the trends over time of gas speed in a nozzle of the engine for engine rotation speeds of 800 revolutions per minute, 1400 revolutions per minute, 1700 revolutions per minute and 2000 revolutions per minute, all these curves being related to the same 5-bar load.

It is possible, for obtaining an accurate flow rate value, to use a mapping that is a function of the load and speed of the engine. The processing subsystem for processing the signal delivered by a flow meter is therefore described below with reference to FIG. 2.

Figure 2:
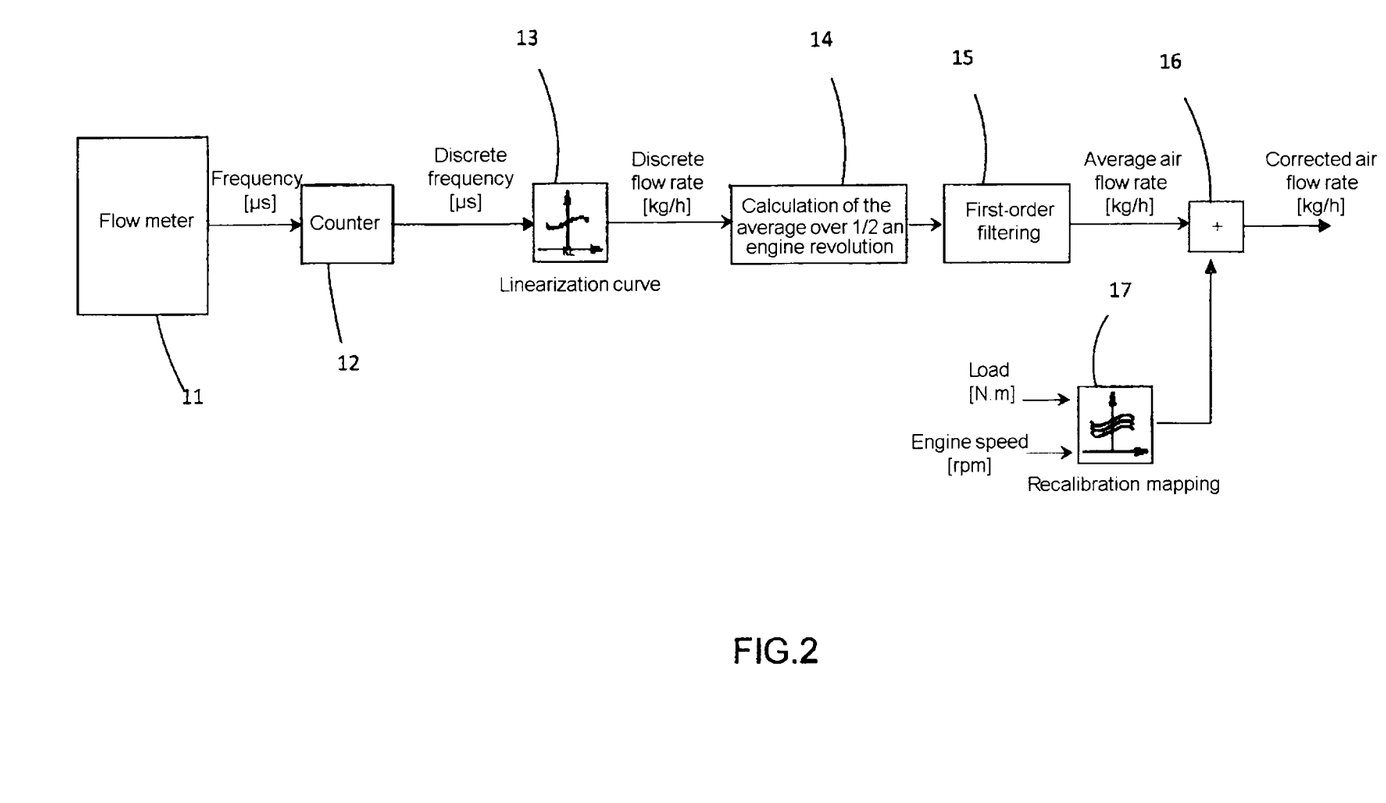
FIG. 2 is a diagram illustrating a subsystem for processing a signal from a flow meter in order to determine an air flow rate value.

A flow meter 11 supplies an electrical signal that has a frequency or a voltage dependent on the gas flow rate passing through the flow meter. Thus, the frequency of the signal is an image of the gas flow rate. A period counter 12 discretizes this frequency, so a discrete frequency is thus obtained at the output of the counter 12. By virtue of a linearization means 13, the discrete frequency is then transformed into a discrete flow rate. This linearization means uses a linearization curve for the flow meter representing the gas flow rate values passing through the flow meter as a function of the frequency of the flow meter output signal. The discrete air flow rate remains an instantaneous item of information which is then averaged over a half-revolution of the engine by virtue of a means 14, then filtered by a first-order filter 15 to give an average gas flow rate information item at the output of the filter 15. Finally, this average air flow rate is corrected by an operator 16 using, for this correction, one or more values supplied by a mapping 17. This mapping 17 supplies one or more values as a function of an engine load value and an engine rotation speed value. Thus, it is possible to obtain an accurate gas flow rate value regardless of the engine load torque and rotation speed values.

Nevertheless, for the future, and from today, it is planned to supplement the intake circuits for the gases used in the operation of the engine with various actuators, notably valves and/or dampers, which, depending on their state, define different intake modes for the engine or different engine intake configurations.

From now on, the intake mode of the engine is no longer defined solely by the engine rotation speed and engine load parameters, but also by the states of these actuators. For example, in the case of future diesel engine production projects compliant with the Euro 6 standard, the engines will have two intake modes:

- a mode A in which an exhaust gas recirculation EGR takes place in a high-pressure section of the intake circuit,
- a mode B in which an exhaust gas recirculation EGR takes place in a low-pressure section of the intake circuit.

Figure 3:
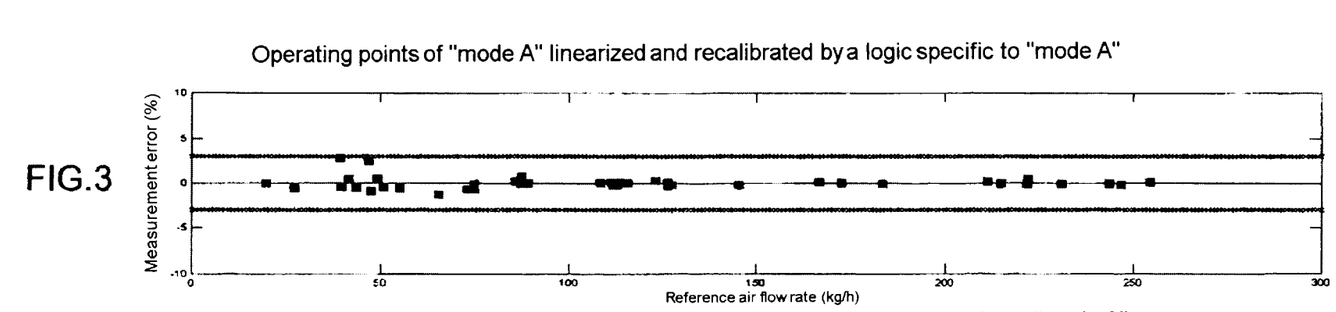
FIG. 3 is a graph illustrating the measurement error produced when the air flow rate is measured with a given flow meter while the engine is operating in a first intake mode, the subsystem for processing the signal from the flow meter being configured and adapted to this first intake mode.

Hitherto, if the processing subsystem described previously is used after having configured it so that it is designed to supply accurate gas flow rate values when the engine is operating in mode A, the graph represented in FIG. 3 will be obtained. It should be noted that, when the engine is operating in mode A, regardless of the air flow rate taken into the engine, the measurement error on the flow rate value supplied by the flow meter is within a range of +/−3%.

Figure 4:
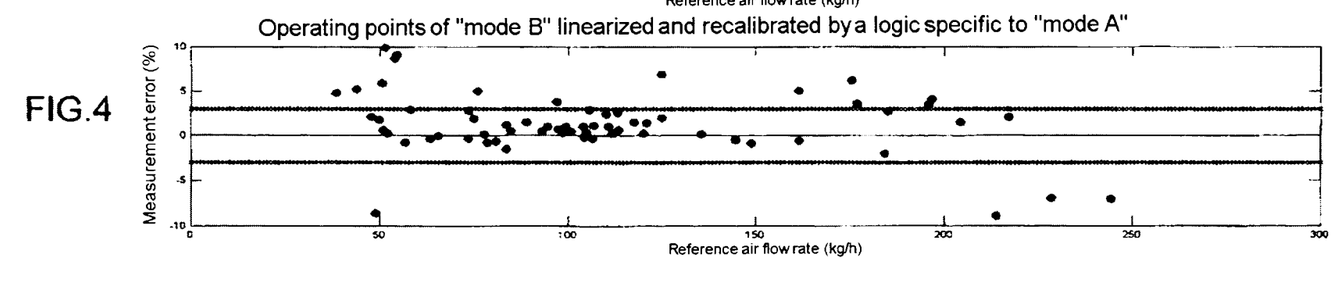
FIG. 4 is a graph illustrating the measurement error produced when the air flow rate is measured with the same flow meter while the engine is operating in a second intake mode, the subsystem for processing the signal from the flow meter being configured and adapted to the first intake mode.

On the other hand, it should be noted that, when the engine is operating in mode B, the measurement error on the flow rate value supplied by the flow meter is outside the range of +/−3% and even reaches +/−10%, as represented in FIG. 4.

The error range of +/−3% represents the acceptable limit of the measurement error on the flow rate for the Euro 6 diesel engine projects.

The various error data from the preceding graphs are obtained by calculating the difference between the flow rates measured by virtue of the flow meter and supplying information by virtue of the processing subsystem defined previously and flow rates measured by virtue of a reference flow meter that is insensitive to the intake modes of the engine for example, this reference flow meter uses an analysis of the composition of the exhaust gases from the engine.

Similarly, the processing subsystem could be configured and adapted to supply accurate flow rate value when the engine is operating in intake mode B. In this case, it would be the flow rate values measured when the engine is operating in mode A that would not have the required accuracy.

BRIEF DESCRIPTION OF DRAWINGS

One solution would be to configure and adapt the processing subsystem according to a compromise logic so that it supplies flow rate values that are as accurate when the engine is operating in mode A as when it is operating in mode B. However, with this solution, the required accuracy would not be achieved either in mode A or in mode B.

The document DE 196 33 680 discloses a method for correcting a signal delivered by a flow meter used to measure the mass flow rate of air in a petrol engine. The flow meter measures the quantity of fresh air taken into the engine, giving an image of the filling of the engine with air. The air flow rate signal delivered by the flow meter is divided by a constant and by the engine speed, so that the signal obtained at the output is a raw air flow rate signal for each stroke, that is to say, an image of the filling of each cylinder of the engine. This raw air flow rate signal for each stroke is then corrected on the basis of a mapping that is a function of the angular position of an intake butterfly valve, of the engine speed and of the intake air temperature. This correction makes it possible to take into account the influence of the air temperature on the filling of the engine by incorporating the temperature of the air actually taken in relative to a standard air temperature. This method has drawbacks. On the one hand, the correction that is a function of the engine speed and of the temperature of air taken into the engine does not make it possible to overcome the influence of the pulsings of the pressure waves present in the intake circuit which have an influence on the filling of the engine. On the other hand, the correction is sensitive to the dispersions of the measurements supplied by the temperature sensor and by the butterfly valve angular position sensor.

The U.S. Pat. No. 6,556,929 discloses a method for correcting a signal delivered by a flow meter via an analysis of the average and amplitude characteristics of the raw signal supplied by this flow meter. The correction applied to the raw average signal from the flow meter is a function of the duration of the engine intake phase and a calibrated mapping, which are themselves a function of the average and of the amplitude of the raw signal from the flow meter. The corrected signal is then sent to the engine control system. This correction method has drawbacks. On the one hand, the correction method does not take into account the pulsatory effects generated in the intake line. On the other hand, the correction method requires significant computation resources.

DETAILED DESCRIPTION

The U.S. Pat. No. 7,286,925 discloses two methods for correcting a signal from a flow meter. The first method consists in modifying a flow meter linearization curve. These curves, reflecting the mass flow rate of air passing through the flow meter as a function of the delivered voltage, are adjusted as a function of the pulsatory state of the air flow. The second method consisting in correcting the error induced by the pulsatings of the engine using a system for filtering the signal delivered by the flow meter. This filtering system combines three filters (a high-pass filter, a low-pass filter and a bandpass filter) and a calibrated offset means. Each filter can be deactivated independently of the others. This filtering system smooths the raw signal delivered by the flow meter. A final correction is applied to the signal delivered by the filtering system based on a mapping that is a function of the frequency characteristics of the signal. These methods have drawbacks. On the one hand, no method for identifying the corrected linearization curve of the flow meter is given and the method is complex to implement in an engine control system because of the complexity of the aero-acoustic phenomena. On the other hand, the correction by the filtering system makes it possible to smooth the signal delivered by the flow meter but does not make it possible to correct the physical influence of the pulsatory phenomena in the engine intake line.

The methods described in these documents are limited to the smoothing of the pulsatings induced by the engine.

BRIEF SUMMARY

The aim of the invention is to provide a method for processing a signal from an air flow meter that makes it possible to remedy the problems described above and that improves the processing methods known from the prior art. In particular, the invention proposes a simple processing method, that makes it possible to obtain an accurate measurement of an air flow rate taken into an engine, while this engine can operate in different intake modes.

According to the invention, the method for processing a signal from a flow meter for measuring a gas flow in an internal combustion engine is characterized in that the signal is processed according to a first logic when the engine is operating in a first intake mode and in that the signal is processed according to a second logic when the engine is operating in a second intake mode.

The first intake mode may be characterized by the activation of a high-pressure EGR valve.

The second intake mode may be characterized by the activation of a low-pressure EGR valve.

The processing method may comprise a step for conversion of an electrical characteristic of the signal from the flow meter into an instantaneous flow rate value, this conversion step being performed according to a first logic when the engine is operating in the first intake mode and according to a second logic when the engine is operating in the second intake mode.

The processing method may comprise a step for calculating an average so as to obtain, from instantaneous flow rate values, an average flow rate value.

The processing method may comprise a correction step so as to obtain, from a flow rate value, a corrected flow rate value, this correction step being performed according to a first logic when the engine is operating in the first intake mode and according to a second logic when the engine is operating in the second intake mode.

The correction step may be performed by virtue of a value supplied by a mapping, this value depending on engine parameters, notably the engine load and/or the rotation speed.

According to the invention, the method for configuring a system for processing a signal from a flow meter for measuring a gas flow in an internal combustion engine is characterized in that it comprises an iteration of the following step:
   determining a processing logic for the signal from the flow meter so as to obtain a flow rate value,
on all the intake modes used by the engine.

The invention also relates to a computer-readable data storage medium on which is stored a computer program comprising software means for implementing the steps of the processing method defined previously.

According to the invention, the system for processing a signal from a flow meter for measuring a gas flow in an internal combustion engine is characterized in that it comprises hardware means and/or software means for implementing the processing method defined previously or for implementing the configuration method defined previously.

According to the invention, the system for measuring a gas flow in an internal combustion engine is characterized in that it comprises a processing system defined previously and a flow meter.

According to the invention, the motor vehicle comprises a processing system defined previously or a measuring system defined previously.

The appended drawing represents, by way of example, illustrations of the principle of the processing method according to the invention.

Figure 5:
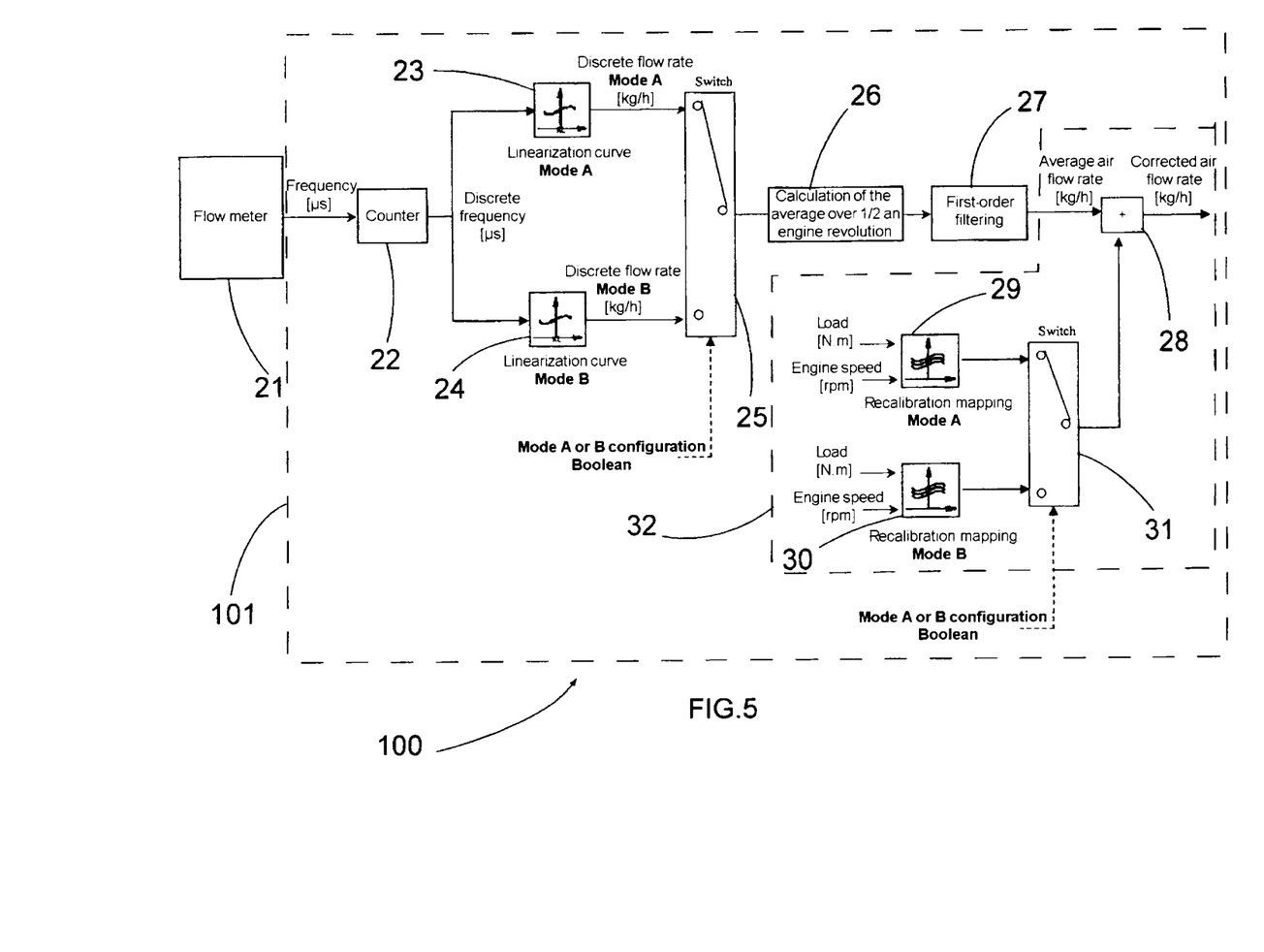
FIG. 5 is a diagram illustrating a subsystem for processing a signal from a flow meter in order to determine an air flow rate value, this processing subsystem conforming to the invention.

An embodiment conforming to the invention of a system 100 for measuring a gas flow rate, notably of intake gas, in a combustion engine, in particular a combustion engine for driving a motor vehicle, is described below with reference to FIG. 5.

The gas flow rate measuring system mainly comprises a flow meter 21 and a system 101 for processing a signal, for example an electrical signal, from the flow meter.

In the embodiment described, a cyclical electrical signal is obtained from the flow meter. The frequency of this electrical signal is determined by the gas flow rate measured by the flow meter. This electrical signal is supplied to the processing system.

A first counting means 22 is used to determine the frequency of the electrical signal received from the flow meter. At the output of the counting means, this frequency value is collected. It is supplied to a first linearization means 23 and to a second linearization means 24. The first linearization means is used to convert the frequency value into a first instantaneous or discrete flow rate value, this conversion being done under the assumption that the internal combustion engine is operating in a first intake mode. The second linearization means is used to convert the frequency value into a second instantaneous or discrete flow rate value, this conversion being done under the assumption that the internal combustion engine is operating in a second intake mode.

The two instantaneous flow rate values are transmitted to a gate 25 which supplies at its output either the first instantaneous flow rate value or the second instantaneous flow rate value, depending on whether the engine is operating in the first intake mode (mode A) or in the second intake mode (mode B). An electrical signal, for example a logic signal, is supplied to this gate 25. The value of this signal is determined by the intake mode in which the engine is operating. It consequently determines which of the two flow rate values supplied by the first and second linearization means is at the output of the gate 25.

A means for calculating an average 26 is used to calculate the average of the instantaneous flow rate obtained at the output of the gate 25 over a given period, for example a half-revolution of the crankshaft of the combustion engine.

The average value obtained at the output of the calculation means 26 is then filtered by virtue of a filtering means 27, for example a first-order filter. An average flow rate value then drives a correction means 32.

The correction means 32 comprises, for example, a first means 29 for determining a recalibration value, for example by use of a mapping, a second means 30 for determining a recalibration value, for example by using a mapping, a logic gate 31 and an addition operator 28. The first means 29 for determining a recalibration value uses engine operating parameters, for example the load and/or the rotation speed of the engine, to determine a first recalibration value. Similarly, the second means 30 for determining a recalibration value uses engine operating parameters, for example the load and/or the rotation speed of the engine, to determine a second recalibration value. The first and second recalibration values are supplied to the gate 31, as is an electrical signal, for example a logic signal. The value of this signal is determined by the intake mode in which the engine is operating. It consequently determines which of the first and second recalibration values supplied by the first and second determination means is at the output of the gate 31 and is supplied to the operator 28. This recalibration value is thus added to the average air flow rate value obtained from the filtering means 27 at the level of the operator 28 to form, at the output of the operator 28, a corrected air flow rate value.

All the means of the processing system may be incorporated in a computer comprising a storage medium or capable of operating with a storage medium. These means, or some of these means, may be produced in the form of computer programs. They are used to govern and/or implement the processing device that is the subject of the present invention.

By virtue of this invention, it is possible to very accurately determine the gas flow rate values taken into an internal combustion engine.

Different variants of the embodiment described previously can be envisaged. For example, the gates 25 and 31 could be located upstream of the means 23, 24, 29, 30 so that only one instantaneous flow rate value is calculated and only one recalibration value is calculated.

Similarly, the operator 28 could be a multiplication operator. In this case, the values obtained at the output of the gate 31 would no longer be consistent with flow rate values, but with dimensionless coefficients.

Finally, it is clear that the processing system according to the invention could be such as to manage more than 2 supply modes. There would then be more than 2 linearization means, each operating according to a different logic, and more than 2 recalibration value determination means, each operating according to a different logic. Thus, it is possible to use a processing logic specific to each intake mode.

The implementation of an intake mode results from various needs such as depollution, regeneration of the particulate filter or even supercharging. These intake modes therefore correspond to well-defined engine states which it is possible to identify and which determine the state of the logic signals driving the gates 25 and 31. Because of this, it is possible to associate a linearization curve and an air flow rate recalibration mapping with an air intake mode. A first supply mode is, for example, characterized by a return of exhaust gas into the intake circuit upstream of the compressor (activation of a low-pressure EGR valve) and a second supply mode is, for example, characterized by a return of exhaust gas into the intake circuit downstream of the compressor (activation of a high-pressure EGR valve). Preferentially, the various intake modes are differentiated by the state (open or closed) of a damper or of a valve in the intake circuit. As a variant, the various intake modes are differentiated by the state (open or closed) of an air damper downstream of a compressor or of a damper upstream of an air filter. Preferentially, the various intake modes are not differentiated by two partially open states of a damper or of a valve, such as a damper partially open to 30° and a damper partially open to 60°.

Figure 9:
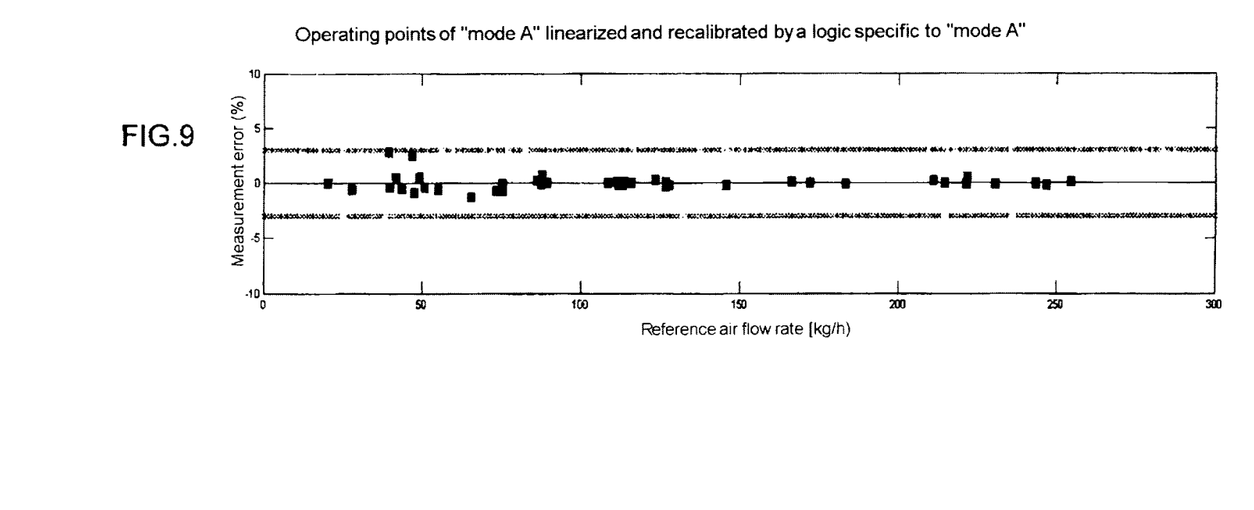

By virtue of the processing system according to the invention, the following results are obtained: When the engine is operating in the mode A, the graph represented in FIG. 9 is obtained. It will be noted that, when the engine is operating in the mode A, regardless of the air flow rate taken into the engine, the measurement error on the flow rate value supplied by the flow meter is within a range of +/−3%.

Figure 8:
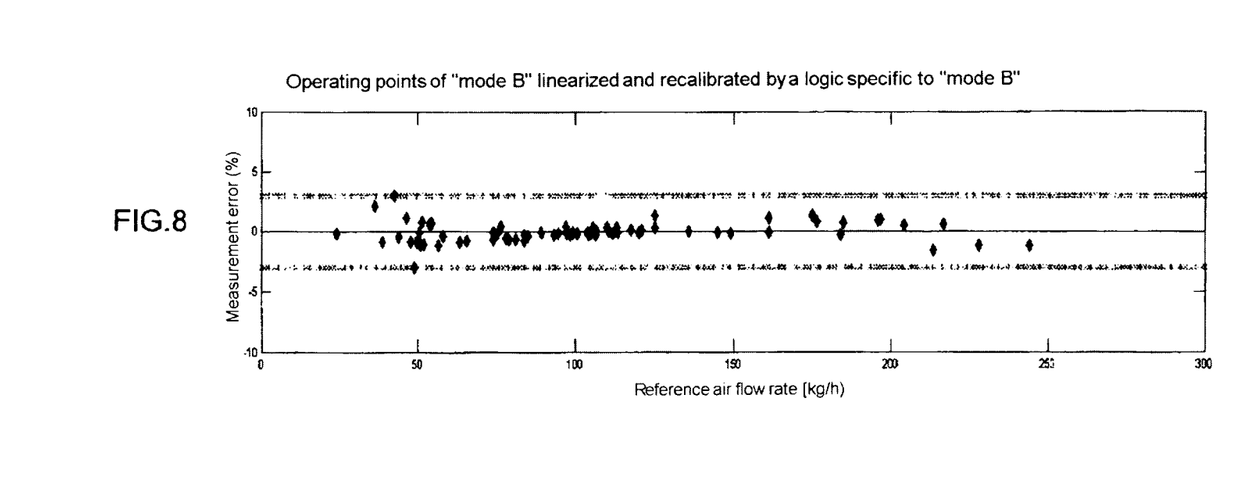
FIGS. 8 and 9 are graphs illustrating the measurement error produced when the air flow rate is measured with one and the same flow meter while the engine is operating in the first intake mode and in the second intake mode, the subsystem for processing the signal from the flow meter being configured and adapted according to the invention.

Similarly, when the engine is operating in mode B, the graph represented in FIG. 8 is obtained. It will be noted that, when the engine is operating in mode B, regardless of the air flow rate taken into the engine, the measurement error on the flow rate value supplied by the flow meter is within a range of +/−3%.

The invention also relates to a method for configuring a system for processing a signal from a flow meter.

In a first step, an engine of the type intended to operate with a system for processing a signal from a flow meter according to the invention is selected.

In a second step, the engine is made to operate in a first supply mode.

In a third step, the engine is made to operate, in a stabilized manner, according to a first set of engine parameter values, for example according to a first pair of engine load/rotation speed values. In this step, the frequency Fhfm of the electrical signal supplied by the flow meter is measured and recorded. Similarly, the reference gas flow rate value Qref supplied to the engine is measured and recorded, this measurement being performed by virtue of a flow rate measuring system that is very accurate and independent of the flow meter. The measurement of the reference flow rate may, for example, be performed by a measurement of the composition of the exhaust gases.

Figure 6:
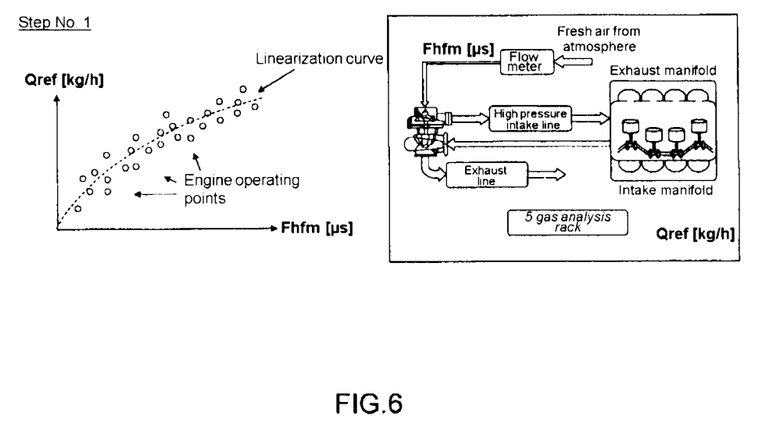
FIGS. 6 and 7 are diagrams illustrating steps for configuring a processing subsystem or a processing system according to the invention, that makes it possible to process a signal from a flow meter in order to supply an accurate flow rate value.

The third step is reiterated a certain number of times with different engine parameter set values, so as to be able to construct a graph such as the one represented in FIG. 6 and giving, on the X axis, the frequency of the electrical signal and, on the Y axis, the measured reference flow rate. The various iterations of the third step make it possible to determine a law, for example a mathematical law, linking the frequency values Fhfm and the reference flow rate values Qref. This law will be implemented in the linearization means which will be implemented when the engine is operating in the first supply mode.

In a fourth step, for each operating point used in the preceding step, a gas flow rate value Qhfm obtained by the previously determined law is determined from the frequency Fhfm of the signal supplied by the flow meter. The difference between this last flow rate value and the reference flow rate value Qref is then determined. This difference and the values of the set of engine parameters used to obtain the frequency Fhfm are recorded.

Figure 7:
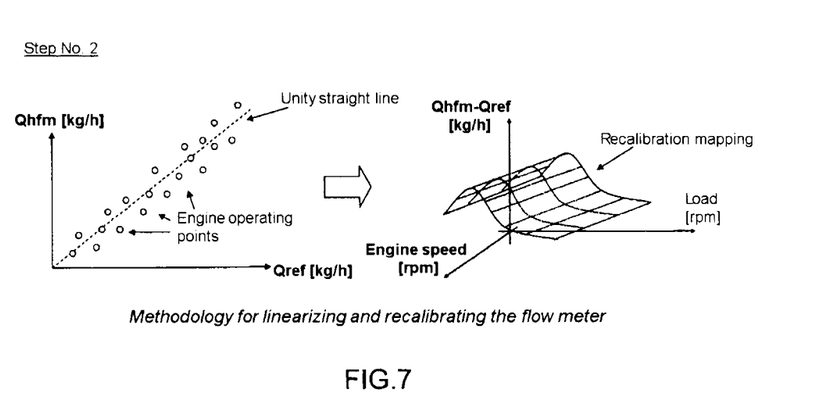

The fourth step is reiterated on all the operating points of the engine so as to be able to construct a mapping such as the one represented in FIG. 7 and giving, on the X axis, the engine speed and, on the Y axis, the load and, as dimensions, the difference between the gas flow rate value Qhfm and the reference gas flow rate value Qref. The different iterations of the fourth step make it possible to determine a law (preferentially a mapping), for example a mathematical law, linking the sets of values of the parameters determining the operating points and the flow rate differences. This law will be used in the correction means which will be implemented when the engine is operating in the first supply mode.

The second to fourth steps are reiterated on all the intake modes that can be used by the engine.

The various laws and mappings are then stored in memory in the system for processing the signal from the flow meter. Thus, the signal from the flow meter can be processed according to the appropriate logic according to the engine supply mode.

The subject of the invention differs from the prior art in which none of the documents provides for a method that enables a flow meter measuring the air flow rate taken into an engine to supply accurate air flow rate measurements when this engine can operate with a number of different intake modes.

The invention claimed is:

1. A method for processing an electrical signal from a flow meter for measuring a gas flow in an internal combustion engine, the method being accomplished by an electronic processing system configured to receive an intake mode signal, the electronic processing system including a gate, the method comprising:
receiving an intake mode signal;
setting the gate in response to the intake mode signal to indicate whether the engine is operating in a first intake mode or in a second intake mode;
receiving the signal from the flow meter;
processing the signal from the flow meter according to a first logic when the gate indicates that the engine is operating in a first intake mode; and
processing the signal from the flow meter according to a second logic when the gate indicates that the engine is operating in a second intake mode.

2. The processing method as claimed in claim 1, wherein the first intake mode includes activation of a high-pressure exhaust gas recirculation valve.

3. The processing method as claimed in claim 1, wherein the second intake mode includes activation of a low-pressure exhaust gas recirculation valve.

4. The processing method as claimed in claim 1, further comprising converting an electrical characteristic of the signal from the flow meter into an instantaneous flow rate value, the converting being performed according to a first conversion logic when the gate indicates that the engine is operating in the first intake mode and according to a second conversion logic when the gate indicates that the engine is operating in the second intake mode.

5. The processing method as claimed in claim 1, further comprising calculating an average via an averaging function so as to obtain, from instantaneous flow rate values, an average flow rate value.

6. The processing method as claimed in claim 1, further comprising correcting so as to obtain, from a flow rate value, a corrected flow rate value, the correcting being performed by applying a mathematical operator to a first recalibration value and a first flow rate value when the gate indicates that the engine is operating in the first intake mode and by applying the mathematical operator to a second recalibration value and a second flow rate value when the gate indicates that the engine is operating in the second intake mode.

7. The processing method as claimed in claim 6, further comprising:
receiving one or more engine parameters;
retrieving, depending on the one or more engine parameters, the first recalibration value from a first mapping when the gate indicates that the engine is operating in the first intake mode; and
retrieving, depending on the one or more engine parameters, the second recalibration value from a second mapping when the gate indicates that the engine is operating in the second intake mode.

8. The processing method as claimed in claim 7, wherein the engine parameters include engine load and/or rotation speed.

9. A non-transitory computer-readable data storage medium on which is stored a computer program that, when implemented by a computer, performs the processing method as claimed in claim 1.

10. An electronic system for processing an electrical signal from a flow meter for measuring a gas flow in an internal combustion engine, comprising:
a first circuit for processing the signal from the flow meter according to a first logic;
a second circuit for processing the signal from the flow meter according to a second logic; and
a gate configured to select the first circuit when the engine is operating in a first intake mode and to select the second circuit when the engine is operating in a second intake mode.

11. A motor vehicle, comprising:
the processing system as claimed in claim 10.

12. A system for measuring a gas flow in an internal combustion engine, comprising:
the processing system as claimed in claim 10; and
a flow meter.

13. A motor vehicle, comprising:
the measuring system as claimed in claim 12.

14. A method for configuring a system for processing a signal from a flow meter for measuring a gas flow in an internal combustion engine, comprising:
determining a processing logic for the signal from the flow meter so as to obtain a flow rate value on a first intake mode used by the engine by:
(1) selecting an engine to operate with the system for processing a signal from a flow meter;
(2) operating the engine in the first intake mode;
(3) operating the engine in a stabilized manner according to an operating point consisting of a set of engine parameter values, and while operating the engine in the stabilized manner:
recording the engine parameter values,
measuring an electrical characteristic of the signal from the flow meter,
recording the value of the electrical characteristic of the signal supplied by the flow meter,
measuring a reference gas flow rate supplied to the engine via a flow rate measuring system that is independent of the flow meter, and
recording the reference gas flow rate value;
(4) repeating step 3 for a second operating point;
(5) constructing from the values recorded for each operating point a graph;
(6) determining from the graph a signal-flow law correlating the electrical characteristic of the signal from the flow meter and the reference flow rate;
(7) applying the signal-flow law to calculate a predicted flow rate value for each operating point;
(8) determining a difference between the predicted flow rate value and the reference flow rate value for each operating point;
(9) recording the difference between the predicted flow rate value and the reference flow rate value for each operating point; and
(10) constructing a signal-difference law from the difference values recorded in step 8; and
determining a processing logic for the signal from the flow meter so as to obtain a flow rate value on a second intake mode used by the engine by repeating steps 3-10 with the engine operating in the second intake mode.

15. The processing method as claimed in claim 1, further comprising filtering the flow rate via a filter.

16. The system of claim 10, further comprising a counter configured to detect an electrical characteristic of the signal from the flow meter, the first circuit including a first linearization curve to convert the electrical characteristic of the signal from the flow meter into an instantaneous flow rate value, and the second circuit including a second linearization curve to convert the electrical characteristic of the signal from the flow meter into an instantaneous flow rate value.

17. The system of claim 10, further comprising a mathematical operator configured to correct a flow rate value, the first circuit including a first recalibration value, and the second circuit including a second recalibration value.

18. The method of claim 14, wherein the signal-difference law is a mapping.

19. The method of claim 14, further comprising storing the signal-flow law in a computer-readable data storage medium.

20. The method of claim 14, further comprising storing the signal-difference law in a computer-readable data storage medium.

* * * * *